Oct. 14, 1969  T. J. TIEDEMA  3,472,365
UTILITY PACKING FOR SMALL-SIZED OBJECTS, PUNCHED
FROM METAL SHEETS
Filed Sept. 25, 1967
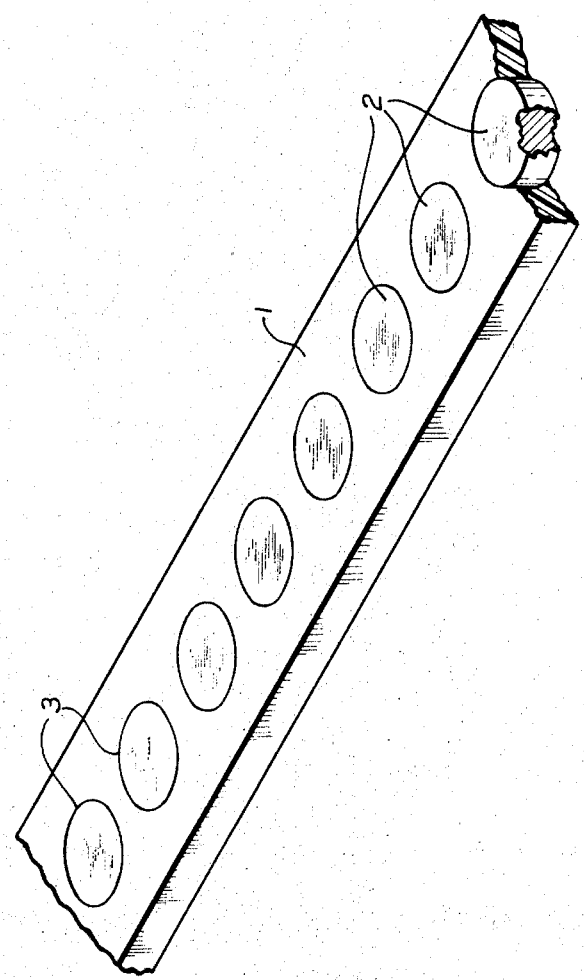
INVENTOR
TIEDE J. TIEDEMA
BY
*James M. Heilman*
ATTORNEY.

United States Patent Office 3,472,365
Patented Oct. 14, 1969

3,472,365
UTILITY PACKING FOR SMALL-SIZED OBJECTS, PUNCHED FROM METAL SHEETS
Tiede J. Tiedema, Arnhem, Netherlands, assignor to N.V. Hollandse Metallurgische Industrie Billiton, The Hague, Netherlands, a corporation of the Netherlands
Filed Sept. 25, 1967, Ser. No. 670,388
Claims priority, application Netherlands, Sept. 26, 1966, 6613526
Int. Cl. B65d 83/04; B23k 3/06; B25k 35/14
U.S. Cl. 206—56                                2 Claims

ABSTRACT OF THE DISCLOSURE

A packaging or packing for transporting small objects punched from a metal, plastic, or similar type sheet, and inserted preferably in a single simultaneous operation into a second sheet of plastic, stiff paper, or other resilient material having holes of approximately the same size and same spacing as the first sheet.

---

This invention relates to a utility packing or packaging for small size objects punched from a metal or other type sheet. These punched objects are intended to be used in the mass production of industrial articles as parts thereof or as auxiliaries therefor.

The attached drawing is a perspective view of an elongated strip or web of plastic, rubber, or coated paper showing punched out holes into which small size objects are inserted for ease of transporting and using.

The packing of such small size objects punched from a metal sheet or other type sheet in such a way that with the aid of this packing the objects may be mechanically fed successively to a predetermined point during the manufacture of the articles. This procedure obviously offers many advantages with respect to the loose packing of a large quantity thereof in a box or like packing means from which the objects have to be removed manually piece by piece.

Moreover, the feeding by means of a utility packing, in which the objects are inserted separately and in a regularly spaced series, offers the advantage of a greater reliability with respect to known feeding devices whereby, for example, the small size objects fall from a container through a rotating perforated bottom plate at the required point.

It is an object of the invention to provide a cheap utility packing for small size objects, punched from metal sheet, in which packing the objects can be easily inserted by means of one single operation, and from which said objects can be easily removed by means of a similar simple operation and whereby the objects are securely held in the packing during the period between these two operations in such a way that they may be mechanically transported by means of said packing.

According to the invention a utility packing for small size objects, punched from metal sheet, is characterized in that a ribbon, consisting of plastic material and having the same thickness as the metal sheet, is provided at equal distances with punch holes of the same shape and size as said punched objects which have been impressed into said punch holes.

The material from which the utility packing is manufactured may be preferably a soft plastic 1, for example soft polyvinyl chloride, polyvinyl alcohol or soft polyethylene. Other materials may be used as well, such as plastic coated paper, cellulose derivatives or rubber. The only condition for a material to be used for the utility packing according to the invention, is the possession of such a plasticity that the packing can be exposed to deformations during transportation, without dislodging the metal objects inserted in the punch holes.

The utility packing according to the invention is particularly suited for feeding soldering material to soldering machines which are used in the mass production of electric and electronic apparatus and parts therefore, but also in other fields of industry. In this embodiment of the invention, preferably circular discs 2 of soldering material are punched from a sheet and subsequently pressed into punch holes 3, present in a ribbon of plastic material. The punching of the holes in the plastic material may take place either prior to, or simultaneously with the punching of the metal.

It is a further advantage of this embodiment of the invention for the feeding of soldering material that it offers the possibility of feeding simultaneously any required auxiliary material, such as a soldering flux, on the spot. This may take place, for example, by leading the ribbon through a bath, containing said auxiliary material.

The invention will be further explained in the following example:

EXAMPLE

Circular discs of tin solder, having a diameter of 1.5 mm. and a thickness of 0.5 mm. are pressed into a ribbon, consisting of soft polyvinyl chloride, having a width of 3 mm. and a thickness of 0.5 mm. in which circular holes, having a diameter of 1.5 mm. are punched at an intermediate distance of 0.3 mm.

Punching the holes and the soldering discs, as well as impressing the soldering discs, takes place by means of two subsequent operations in a punching device, through which a ribbon of soldering material together with a ribbon of polyvinyl chloride are conducted in the same direction.

The utility packing, thus obtained, may be bent in all directions without unintentionally dislodging the soldering discs.

I claim:

1. Utility packaging for small objects, comprising a sheet, objects punched from said sheet, characterized in that a ribbon, consisting of a relatively stiff material and having the same thickness as said sheet is provided at spaced distances equal to those of said sheet with punched holes of the same shape and size as said punched-out objects, said punched objects friction-fitted into said punched holes in said ribbon, and said sheet being soldering material, and said ribbon for receiving and transporting said punched-out objects is of relatively soft but resilient plastic, and wherein said packaging is particularly suited for the feeding of soldering material to soldering machines, characterized in that said ribbon of plastic material with circular punch holes has discs of soldering material with the same diameter as said punch holes forced and held therein while being stored or transported to soldering machines.

2. Utility packaging for small objects, comprising a sheet, objects punched from said sheet, characterized in that a ribbon, consisting of a relatively stiff material and having the same thickness as said sheet is provided at spaced distances equal to those of said sheet with punched holes of the same shape and size as said punched out objects, said punched objects friction-fitted into said punched holes in said ribbon, and wherein said sheet is metallic, and said ribbon for receiving and transporting said punched out objects is of relatively soft but resilient plastic, and wherein said packaging is particularly suited for the feeding of soldering material to soldering machines, characterized in that said ribbon of plastic material with circular punch holes has discs of soldering material with the same diameter as said punch holes have been forced and held therein while being stored or transported to soldering machines, and wherein said metallic sheet is of solder approximately .5 mm. thick, said objects are circular and are approximately 1.5 mm. in diameter, and said plastic ribbon is relatively soft polyvinyl chloride in the order of approximately .5 mm. thick, 3 mm. in width, and having circular holes with an approximate diameter of 1.5 mm. said holes being spaced apart a minimum distance from each other.

References Cited

UNITED STATES PATENTS

| | | | |
|---|---|---|---|
| 1,375,479 | 4/1921 | Van Allen. | |
| 2,815,121 | 12/1957 | Helpard | 206—56 |
| 3,211,284 | 10/1965 | Anstett | 206—56 |
| 3,327,089 | 6/1967 | Napoli | 221—73 |
| 2,027,667 | 1/1936 | Brinkman | 229—92.9 |

FOREIGN PATENTS

| | | |
|---|---|---|
| 1,072,551 | 12/1959 | Germany. |

WILLIAM T. DIXSON, Jr., Primary Examiner

U.S. Cl. X.R.

221—73; 228—56